US007711539B1

(12) United States Patent
Kimmel et al.

(10) Patent No.: US 7,711,539 B1
(45) Date of Patent: May 4, 2010

(54) SYSTEM AND METHOD FOR EMULATING SCSI RESERVATIONS USING NETWORK FILE ACCESS PROTOCOLS

(75) Inventors: Jeffrey S. Kimmel, Chapel Hill, NC (US); Robert Hawley, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1131 days.

(21) Appl. No.: 10/217,038

(22) Filed: Aug. 12, 2002

(51) Int. Cl.
*G06F 9/455* (2006.01)

(52) U.S. Cl. .................. 703/24; 703/23; 703/25; 707/1; 707/200; 707/205; 709/217; 709/226; 709/230; 709/236; 709/223; 719/324; 719/326; 719/327; 711/100; 711/202; 711/203; 711/112; 711/214; 710/8; 710/11; 710/74

(58) Field of Classification Search ........... 703/23–25, 703/21; 711/4, 202, 203, 112, 214, 100, 711/11; 709/250, 226, 330, 217, 230, 223, 709/236; 707/1, 205, 200, 204; 710/8, 74; 719/324, 326, 327

See application file for complete search history.

(56) References Cited

U.S. PATENT DOCUMENTS

| 5,163,131 | A | | 11/1992 | Row et al. |
| 5,355,453 | A | * | 10/1994 | Row et al. .................. 709/219 |
| 5,485,579 | A | | 1/1996 | Hitz et al. |
| 5,598,532 | A | * | 1/1997 | Liron ........................... 703/2 |
| 5,802,366 | A | | 9/1998 | Row et al. |
| 5,819,292 | A | | 10/1998 | Hitz et al. |
| 5,931,918 | A | * | 8/1999 | Row et al. .................. 719/321 |
| 5,941,972 | A | * | 8/1999 | Hoese et al. ................ 710/315 |
| 5,963,962 | A | | 10/1999 | Hitz et al. |
| 6,038,570 | A | | 3/2000 | Hitz et al. |
| 6,041,350 | A | * | 3/2000 | Takimoto .................... 709/223 |
| 6,061,722 | A | * | 5/2000 | Lipa et al. ................... 709/224 |
| 6,065,037 | A | * | 5/2000 | Hitz et al. ................... 709/200 |
| 6,215,771 | B1 | * | 4/2001 | Turner et al. ................ 370/235 |
| 6,272,611 | B1 | * | 8/2001 | Wu ............................. 711/173 |
| 6,425,035 | B2 | * | 7/2002 | Hoese et al. ................ 710/105 |
| 6,457,130 | B2 | * | 9/2002 | Hitz et al. .................... 726/27 |
| 6,701,449 | B1 | * | 3/2004 | Davis et al. .................... 714/4 |
| 6,735,601 | B1 | * | 5/2004 | Subrahmanyam ........... 707/200 |
| 6,779,063 | B2 | * | 8/2004 | Yamamoto ................... 710/74 |
| 6,779,083 | B2 | * | 8/2004 | Ito et al. ..................... 711/114 |
| 6,823,458 | B1 | * | 11/2004 | Lee et al. ..................... 726/16 |
| 6,834,326 | B1 | * | 12/2004 | Wang et al. ................. 711/114 |

(Continued)

OTHER PUBLICATIONS

S. W. Bailey, and D. D. Woelz, "An Implementation of a GSN to Fibre Channel Bridge Using Scheduled Transfer Encapsulation of the SCSI Protocol" Nov. 6, 1998, pp. 1-9.*

(Continued)

*Primary Examiner*—Kamini S Shah
*Assistant Examiner*—Kibrom Gebresilassie
(74) *Attorney, Agent, or Firm*—Cesari and McKenna, LLP

(57) ABSTRACT

A system and method for emulating SCSI reservations using network file access protocols is provided. The system and method enable applications or operating systems on a networked computer designed to utilize SCSI reservations on only locally attached storage to also access networked data storage. The emulation occurs transparently to higher levels of operating systems or applications so that the applications or operating systems which are designed to only access locally attached storage may be enabled to access networked storage.

16 Claims, 7 Drawing Sheets

U.S. PATENT DOCUMENTS

| | | | |
|---|---|---|---|
| 6,895,429 B2* | 5/2005 | Banga et al. | 709/215 |
| 6,895,453 B2* | 5/2005 | Allen et al. | 710/33 |
| 6,907,457 B2* | 6/2005 | Merrell et al. | 709/223 |
| 6,912,207 B2* | 6/2005 | Ohnishi et al. | 370/255 |
| 6,954,881 B1* | 10/2005 | Flynn Jr. et al. | 714/43 |
| 7,085,867 B2* | 8/2006 | Qi | 710/200 |
| 7,180,872 B2* | 2/2007 | Bailey et al. | 370/252 |
| 7,194,538 B1* | 3/2007 | Rabe et al. | 709/224 |
| 7,272,674 B1* | 9/2007 | Nandi et al. | 710/38 |
| 7,526,574 B2* | 4/2009 | Hufferd et al. | 709/246 |
| 7,565,413 B1* | 7/2009 | O'Toole, Jr. | 709/219 |
| 2001/0039622 A1* | 11/2001 | Hitz et al. | 713/201 |
| 2001/0052061 A1* | 12/2001 | Fradette | 711/202 |
| 2002/0019936 A1* | 2/2002 | Hitz et al. | 713/165 |
| 2002/0112022 A1 | 8/2002 | Kazar et al. | |
| 2002/0116593 A1* | 8/2002 | Kazar et al. | 711/202 |
| 2002/0129204 A1* | 9/2002 | Leighnor et al. | 711/118 |
| 2002/0156984 A1* | 10/2002 | Padovano | 711/148 |
| 2002/0161982 A1* | 10/2002 | Riedel | 711/170 |
| 2002/0184463 A1* | 12/2002 | Arakawa et al. | 711/170 |
| 2003/0046366 A1* | 3/2003 | Pardikar et al. | 709/219 |
| 2003/0065782 A1* | 4/2003 | Nishanov et al. | 709/226 |
| 2003/0182455 A1* | 9/2003 | Hetzler et al. | 709/250 |
| 2004/0030668 A1* | 2/2004 | Pawlowski et al. | 707/1 |
| 2004/0030822 A1* | 2/2004 | Rajan et al. | 711/4 |
| 2004/0039827 A1* | 2/2004 | Thomas et al. | 709/228 |
| 2004/0078521 A1* | 4/2004 | Hawks et al. | 711/118 |
| 2004/0143643 A1* | 7/2004 | Takamoto et al. | 709/215 |
| 2004/0233910 A1* | 11/2004 | Chen et al. | 370/395.5 |
| 2004/0236673 A1* | 11/2004 | Eder | 705/38 |
| 2004/0243630 A1* | 12/2004 | Kanie | 707/104.1 |
| 2004/0255048 A1* | 12/2004 | Lev Ran et al. | 709/249 |
| 2005/0144200 A1* | 6/2005 | Hesselink et al. | 707/204 |
| 2005/0190780 A1* | 9/2005 | Bailey et al. | 370/419 |
| 2005/0193058 A1* | 9/2005 | Yasuda et al. | 709/203 |
| 2005/0289218 A1* | 12/2005 | Rothman et al. | 709/203 |
| 2006/0010316 A1* | 1/2006 | Burokas et al. | 713/2 |
| 2006/0242179 A1* | 10/2006 | Chen et al. | 707/100 |
| 2007/0022314 A1* | 1/2007 | Erasani et al. | 714/4 |
| 2007/0288535 A1* | 12/2007 | Shitomi et al. | 707/204 |
| 2009/0024752 A1* | 1/2009 | Shitomi | 709/230 |

OTHER PUBLICATIONS

U.S. Appl. No. 10/188,250, Dennis E. Chapman.

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

NCI TS 332-1999 Fibre Channel Arbitrated Loop (FC-AL-2) published by the American National Standards Institute.

Bob Snively, New Identifier Formats Based on IEEE Registration X3T11/96-467, revision 2.

SCSI-3 Primary Commands, published by the American National Standard for Information Systems, Revision 11a, printed Mar. 29, 1997.

Custer, Helen. "Inside the Windows NT File System", Copyright 1994, Microsoft Corporation, 53 pages.

* cited by examiner

SYSTEM AND METHOD FOR EMULATING SCSI RESERVATIONS USING NETWORK FILE ACCESS PROTOCOLS

FIELD OF THE INVENTION

This invention relates to network storage systems and, more particularly to accessing remote networked storage systems.

BACKGROUND OF THE INVENTION

Data communication in a computer network involves the exchange of data between two or more entities interconnected by communication links. These entities are typically software programs executing on hardware computer systems that include locally attached storage devices. Depending on their roles within the network, these computer systems may serve as intermediate network nodes or end nodes. Examples of end nodes may include client and server systems coupled to a communication link, such as a point-to-point link, shared local area network, wide area network or virtual private network implemented over a public network, such as the Internet.

A server is a computer configured to provide specific services. When operating according to a client/server model of information delivery, the server may be configured to allow many clients to access its services. In this model, the client may comprise an application executing on an operating system that "connects" to the server over the computer network. Each client may request the services of the server by issuing protocol messages (in the form of packets) to the server over the network. The server then responds to the client request by returning the requested services in the form of packets transported over the network.

A filer is a server configured to provide file service relating to the organization of information on storage devices, such as disks. The filer may be embodied as a storage system including a storage operating system that implements a file system to logically organize the information as a hierarchical structure of directories and files on the disks. Each "on-disk" file may be implemented as a set of disk blocks configured to store information, such as data, whereas the directory may be implemented as a specially formatted file in which information about other files and directories are stored.

An example of an application running on a client is the Microsoft® Exchange application available from Microsoft Corporation, of Redmond, Wash. Microsoft Exchange is a messaging and collaboration software product that provides a variety of applications for group interaction using networked computer systems. An Exchange application can run on a variety of operating systems including, for example, the Microsoft Windows® NT™ or Microsoft Windows® 2000 operating system. A file system designed for use with the NT or Windows 2000 operating system is the NT file system (NTFS). In NTFS, each unit of information associated with a file, including its name, its owner, its time stamps and its data contents, is implemented as a file attribute. Both files and directories have attributes, wherein each attribute consists of a single stream or sequence of bytes. This implementation facilitates the addition of more attributes, including data content attributes, to a file. The NTFS file system is well-known and further described in *Inside the Windows NT File System* by Helen Custer, Microsoft Press, 1994.

The conventional Small Computer System Interface (SCSI) protocol is a block access protocol configured to access storage devices (disks). Many computer systems use the SCSI protocol to access data on storage devices locally attached to the systems. Many systems also support facilities adapted to access network attached storage through file access protocols, such as the Network File System (NFS) and Common Internet File System (CIFS) protocols. Applications running on a client system can access files contained on either locally attached or network attached storage.

There are differences, however, in the interpretation of data that is exchanged using block access protocols compared to file access protocols. A block access protocol, such as the SCSI protocol, "assumes" that the storage device is composed of a sequence of blocks, each containing either data or available space for storing data. Requests for retrieving (reading) or storing (writing) data contain references for block numbers and data lengths. As a result, an application issuing a SCSI request (i.e., a SCSI requester) must have knowledge of the metadata mapping between the desired data and the physical location of that data on the storage device.

In contrast, file access protocols assume that the server contains a file system on which file data is stored. The file system generally refers to structuring of data and metadata on storage devices, such as disks, which permits reading/writing of data on those disks. The file system also includes mechanisms for performing these operations. While different file access protocols provide different semantics, each protocol fundamentally provides access to file system constructs, such as directories and files. The file server is responsible for mapping the files to its storage system.

A filer generally provides higher data capacity, data storage speed and data access speed than disks locally attached to a client. It is therefore often desirable for a client system to utilize a filer for networked data storage. However, some applications running on a client are unable to utilize networked data storage because the file system operations provided by the file access protocol may not fully match the operations provided by the file system residing on the client. For example, some operations that are available on the NTFS file system used with the Windows 2000 operating system are not available over the CIFS protocol. One solution that allows those applications that require block-based file systems is described in U.S. patent application Ser. No. 10/188,250, now U.S. Pat. No. 7,584,279 entitled SYSTEM AND METHOD FOR MAPPING BLOCK-BASED FILE OPERATIONS TO FILE LEVEL PROTOCOLS, by Dennis E; Chapman, the teachings of which are hereby incorporated by reference as though fully set forth herein.

While generally, only one host computer is connected to a SCSI bus, it is possible for multiple controllers to be interconnected to a SCSI bus. Additionally, as the SCSI protocol operates across multiple forms of networks, such as Fibre Channel, Transport Control Protocol/Internet Protocols, and InfiniBand, shared access to SCSI storage is widely implemented. Whenever this shared access occurs, there is a possibility of multiple controllers contending for the disks or other resources on the SCSI bus. To allow multiple hosts to coordinate their access to a shared storage device, the SCSI protocol includes a reserve and release mechanism that allows hosts to establish, release, or revoke exclusive access to a specific SCSI device. This exclusivity allows limited write access to the storage device and optionally, limited read access to the storage device as well. These SCSI reservations and their attributes are described in further detail in *SCSI-3 Primary Commands* published by the American National Standards Institute, Inc., the contents of which are hereby incorporated by reference.

Many clustering systems use SCSI reservations for synchronization within the cluster. For example, the Microsoft Cluster Service (MSCS) uses SCSI reservations to determine which system should be the cluster master. MSCS does this by relying on one system being able to require a SCSI reservation on a shared disk (the quorum disk). A Microsoft Windows 2000 Advanced Server System that is bidding to be a master of a MSCS cluster attempts to acquire a SCSI shared read reservation on the quorum disk. If the system acquires the reservation, then it succeeds in becoming the cluster master, however if it fails to obtain a SCSI reservation, then another system is the master of the cluster.

As described above, a file server or filer generally provides higher data capacity, data storage speed and data access speed than disks locally attached to a client. However, file servers may prefer to use a file-based protocol, such as the Network File System (NFS) protocol, and are therefore, incompatible with a cluster requiring directly attached SCSI disks. Consequently, such a file server cannot be reserved using SCSI reservations, and therefore can not be utilized with cluster products that employ SCSI reservation semantics, such as the Microsoft Clustering System.

While the above-described patent application, entitled SYSTEM AND METHOD FOR MAPPING BLOCK-BASED FILE OPERATIONS TO FILE LEVEL PROTOCOLS, describes a SCSI block-based system and method for mapping a read and write operations to a file level protocol, a reliable methodology for allowing SCSI reservations to be utilized with a file server attached to a clustering system is required.

SUMMARY OF THE INVENTION

The disadvantages of the prior art are overcome by providing a system and method for emulating small computer system interface (SCSI) reservations on a network attached storage system. A data access protocol software driver of the computer includes a mapping function that maps a SCSI reservation command to a file access control method associated with a virtual logical disk (VLD) of the locally attached storage system. This arrangement advantageously enables applications or clients adapted to access data stored only on disks of a locally attached storage system to access data and utilize SCSI reservations of a network attached storage on a filer.

A novel data access protocol driver provides a reservation emulation function that maps SCSI reservation operations to a file access control method. In the illustrative embodiment, a UNIX GID/UID access control method is used to emulate the SCSI reservation. Each node in a cluster has a unique GID, while all nodes share the same UID. In the illustrative embodiment, the novel data access protocol driver utilizes the VLD's GID to track the node in a cluster that currently has a reservation on the VLD.

The data access protocol driver sets the GID associated with the file that contains the VLD to equal the GID of the node that currently holds the SCSI reservation on the VLD. The data access protocol driver maps SCSI reservation operations to changes of the VLD's GID.

In an illustrative embodiment, a clustering environment, such as a MSCS cluster, utilizes the data access protocol software driver to map a SCSI reservation to a known file access control method supported on the network attached storage system. Accordingly, an application or operating system executing on a client can issue normal SCSI reservation commands. The VLD functions as a data container for storing the file as a logical representation of a disk in the storage system locally attached to the client.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Network Environment

Figure 1:
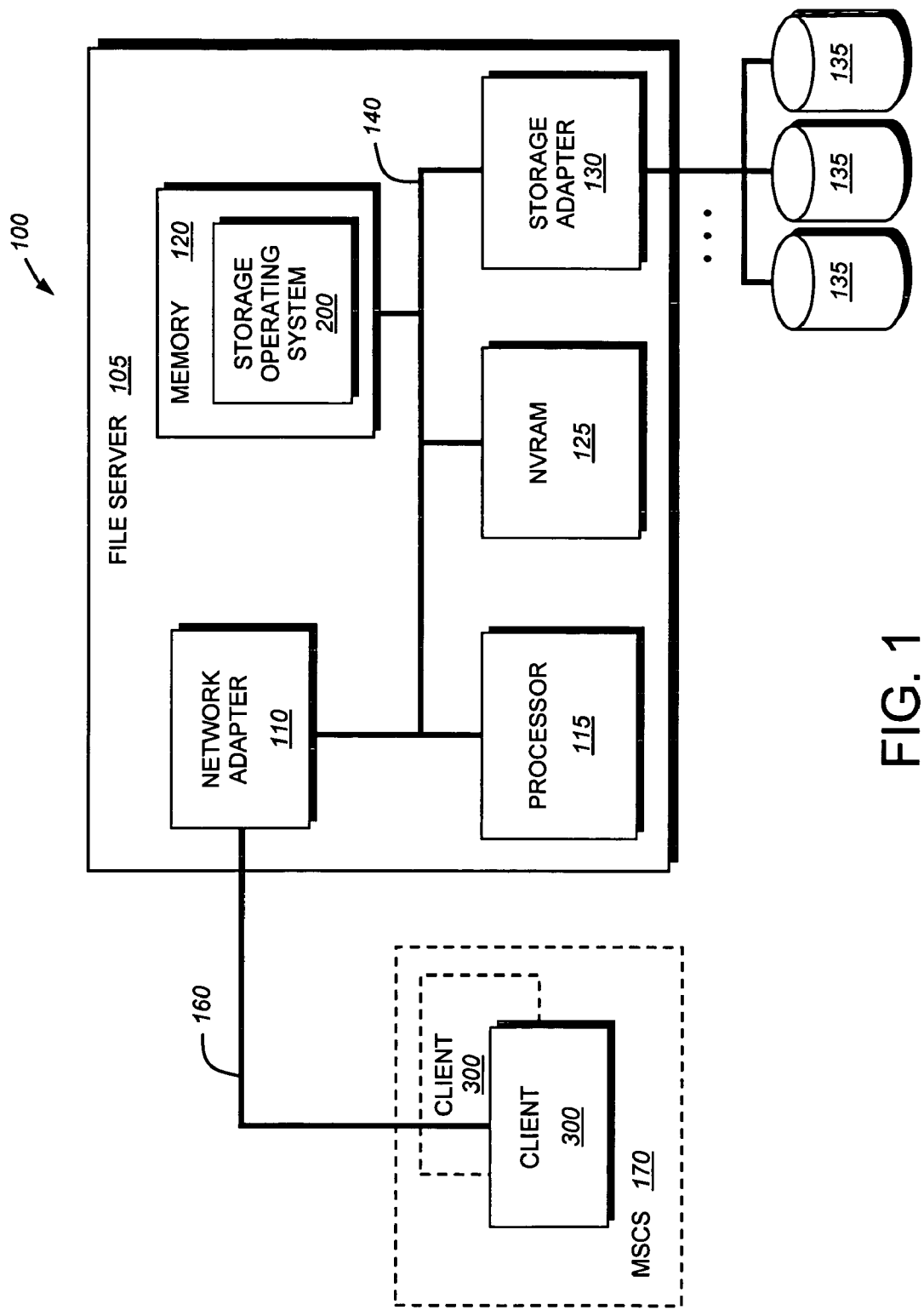
FIG. 1 is a schematic block diagram of an exemplary network environment in accordance with an embodiment of the invention.

FIG. 1 is a schematic block diagram of a computer network 100 including a plurality of clients 300 in an exemplary Microsoft Clustering System (MSCS) 170 environment and a file server 105 that may be advantageously used with the present invention. The file server or "filer" 105 is a computer that provides file service relating to the organization of information on storage devices, such as disks 135. The filer 105 comprises a processor 115, a memory 120, a network adapter 110 and a storage adapter 130 interconnected by a system bus 140. The filer 105 also includes a storage operating system 200 (see generally FIG. 2) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, filer 105 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 120 comprises storage locations that are addressable by the processor and adapters for storing software program code. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 110 comprises the mechanical, electrical and signaling circuitry needed to connect the filer 105 to client 300 over the network 160 which may comprise a point-to-point connection or a shared medium, such as a local area network. Moreover, the client 300 may interact with the filer 105 in accordance with a client/server model of information delivery. That is, the client may request the services of the filer, and the filer may return the results of the services requested by the client by exchanging packets encapsulating, e.g., the NFS protocol format over the network 160.

The storage adapter 130 cooperates with the operating system 200 executing on the filer to access information requested by the client. The information may be stored on the disks 135 that are attached to the filer 105 or other node of a storage system as defined herein. The storage adapter 130 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 115 (or the adapter 130 itself) prior to being forwarded over the system bus 140 to the network adapter 110, where the information is formatted into a packet and returned to the client 300.

In one exemplary filer implementation, the filer 105 can include a nonvolatile random access memory (NVRAM) 125 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 135 are arranged into a plurality of volumes, each having a file system associated therewith. Each volume includes one or more disks 135. In one embodiment, the physical disks 135 are configured into RAID groups so that some disks store striped data and some disks store separate parity for the data, in accordance with an illustrative RAID 4 configuration. However, other configurations (e.g. RAID 5 having distributed parity across the disks) are also contemplated. In this embodiment, a minimum of one parity disk and one data disk is employed. However, a typical implementation may include three data and one parity disk per RAID group, and a multiplicity of RAID groups per volume.

The clustering environment 170 (MSCS in this example) can include a plurality of clients 300 arranged according to the cluster specification. For example, two clients can be connected as a two-node cluster so that in the event of a failure of one, the other assumes operations and functions associated with the failed client.

B. Storage Operating System

To facilitate generalized access to the disks 135, the storage operating system 200 implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. In the illustrative embodiment described herein, the storage operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

As used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
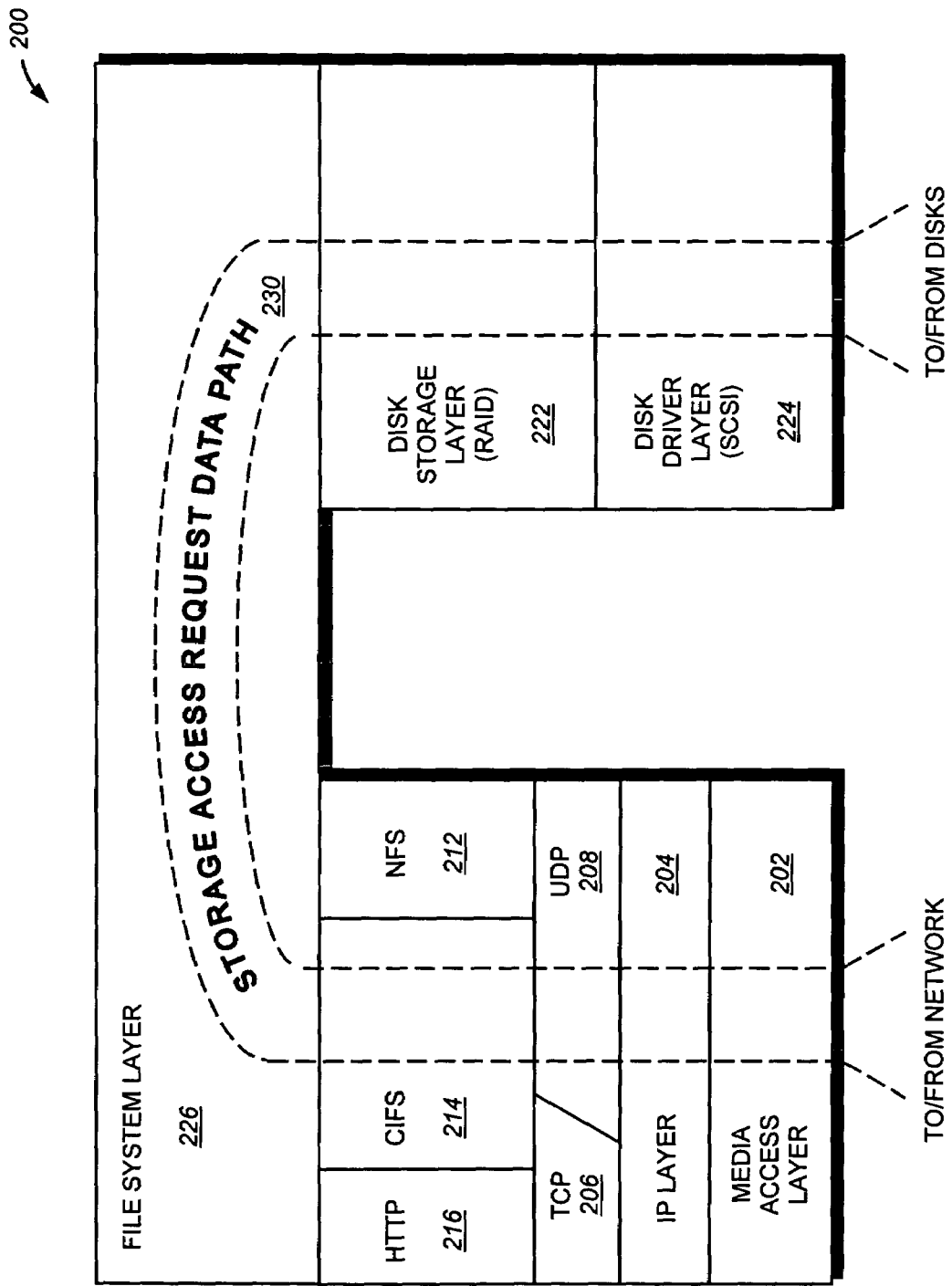
FIG. 2 is a schematic block diagram of an exemplary storage operating system for use with a file server in accordance with an embodiment of the invention.

The organization of the preferred storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 202 of network drivers (e.g., an Ethernet driver). The operating system further includes network protocol layers, such as the Internet Protocol (IP) layer 204 and its supporting transport mechanisms, the Transport Control Protocol (TCP) layer 206 and the User Datagram Protocol (UDP) layer 208. A file system protocol layer provides multi-protocol data access and, to that end, includes support for the Common Internet File System (CIFS) protocol 214, the Network File System (NFS) protocol 212 and the Hypertext Transfer Protocol (HTTP) protocol 216. In addition, the storage operating system 200 includes a disk storage layer 222 that implements a disk storage protocol, such as a RAID protocol, and a disk driver layer 224, that implements a disk control protocol such as the small computer system interface (SCSI).

Bridging the disk software layers with the network and file system protocol layers is a file system layer 226 of the storage operating system 200. Generally, the layer 226 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 120. If the information is not in memory, the file system layer 226 indexes into an inode file using an inode number to access an appropriate entry and retrieve a logical volume block number. The file system layer 226 then passes the logical volume block number to the disk storage (RAID) layer 222, which maps that logical number to a disk block number and sends the latter to an appropriate driver (for example, an encapsulation of SCSI implemented on a fibre channel disk interconnection) of the disk driver layer 224. The disk driver accesses the disk block number from volumes and loads the requested data in memory 120 for processing by the filer 105. Upon completion of the request, the filer (and storage operating system) returns a reply.

Figure 3:
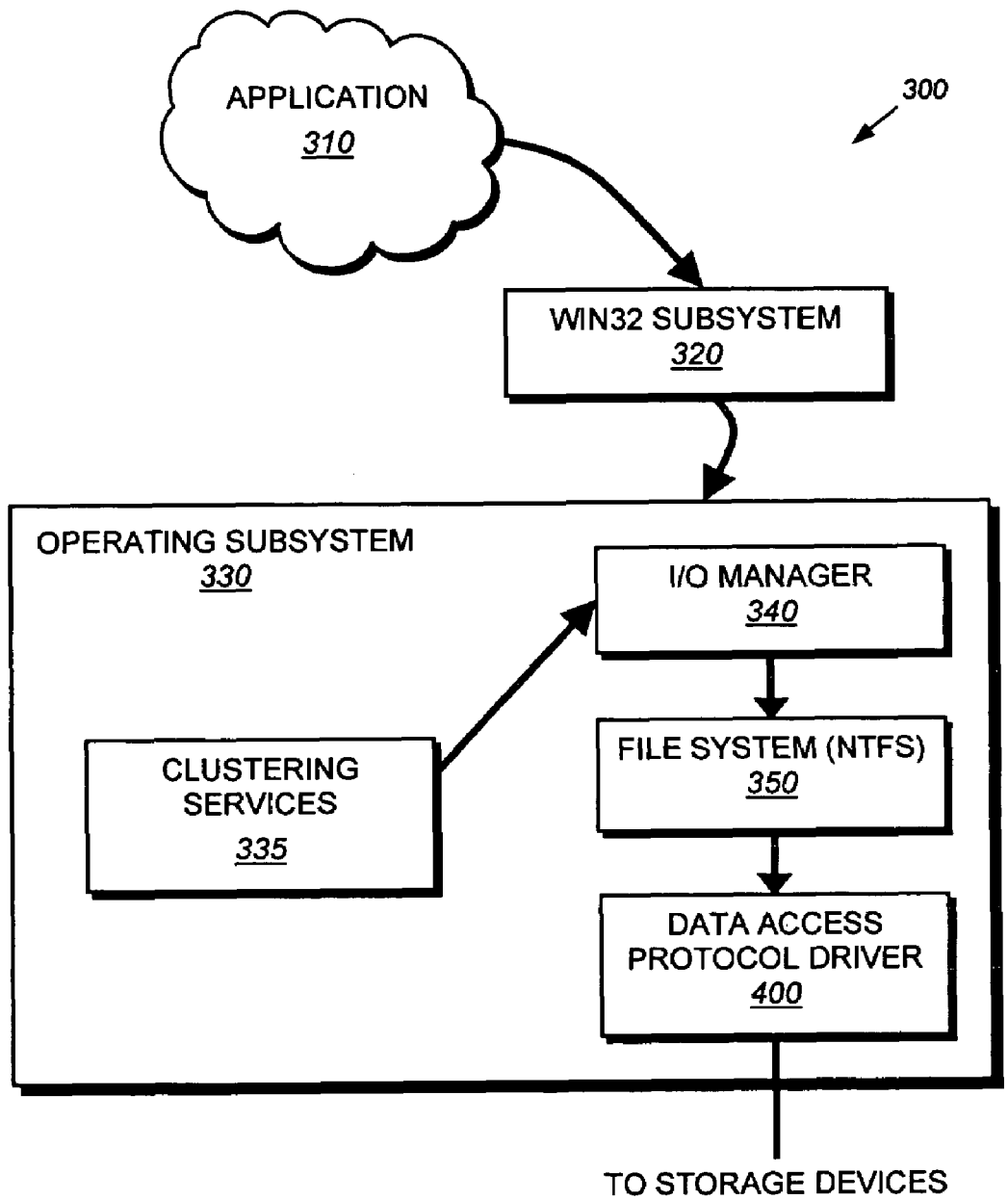
FIG. 3 is a schematic block diagram of an exemplary operating system for use on a client in accordance with an embodiment of the invention.

It should be noted that the software "path" 230 through the storage operating system layers described above needed to perform data storage access for the client request received at the filer may alternatively be implemented in hardware or a combination of hardware and software. That is, in an alternate embodiment of the invention, the storage access request data path 230 may be implemented as logic circuitry embodied within a field programmable gate array (FPGA) or an application specific integrated circuit (ASIC). This type of hardware implementation increases the performance of the file service provided by filer 105 in response to file system requests C. Client FIG. 3 is a schematic block diagram of client 300 including an application 310 running on an operating system 330. An example of an application and an operating system that may be advantageously used with the present invention are the Microsoft Exchange application and the Microsoft Windows® NT™ or Microsoft Windows 2000 operating system available from Microsoft Corporation. Note that a Win 32 subsystem 320 is provided to make Windows application programming interfaces (APIs) available to application programs, such as application 310, to access the operating system 300.

The operating system 300 comprises, inter alia, an I/O manager 340 that implements device-independent I/O facilities. The I/O manager further allows device drivers and file systems (which are also viewed as "device drivers") to be dynamically loaded into and out of the operating system. These drivers are modular and "layered" to allow different file systems to call, e.g., the same disk driver to access files. An example of a disk driver is the Small Computer System Interface (SCSI) driver adapted to access data stored in files on storage devices, such as the disks (not shown) of a locally attached storage system.

Also included in the operating system 330 is a set of clustering services 335 that implement the various clustering functions of the operating system. These clustering functions include, inter-alia, a process to arbitrate which systems in a cluster is the master system. In the example of a MSCS cluster, this process attempts to obtain SCSI reservation on a defined quorum disk. If the system can obtain a reservation it succeeds in becoming the cluster master.

A file system designed for use with operating system 300 is the NT file system (NTFS) 350. In NTFS, each unit of information associated with a file, including its name, its owner, its time stamps and its data contents, is implemented as a file attribute. Both files and directories have attributes, wherein each attribute consists of a single stream or sequence of bytes. This implementation facilitates the addition of more attributes, including data content attributes, to a file.

Figure 4:
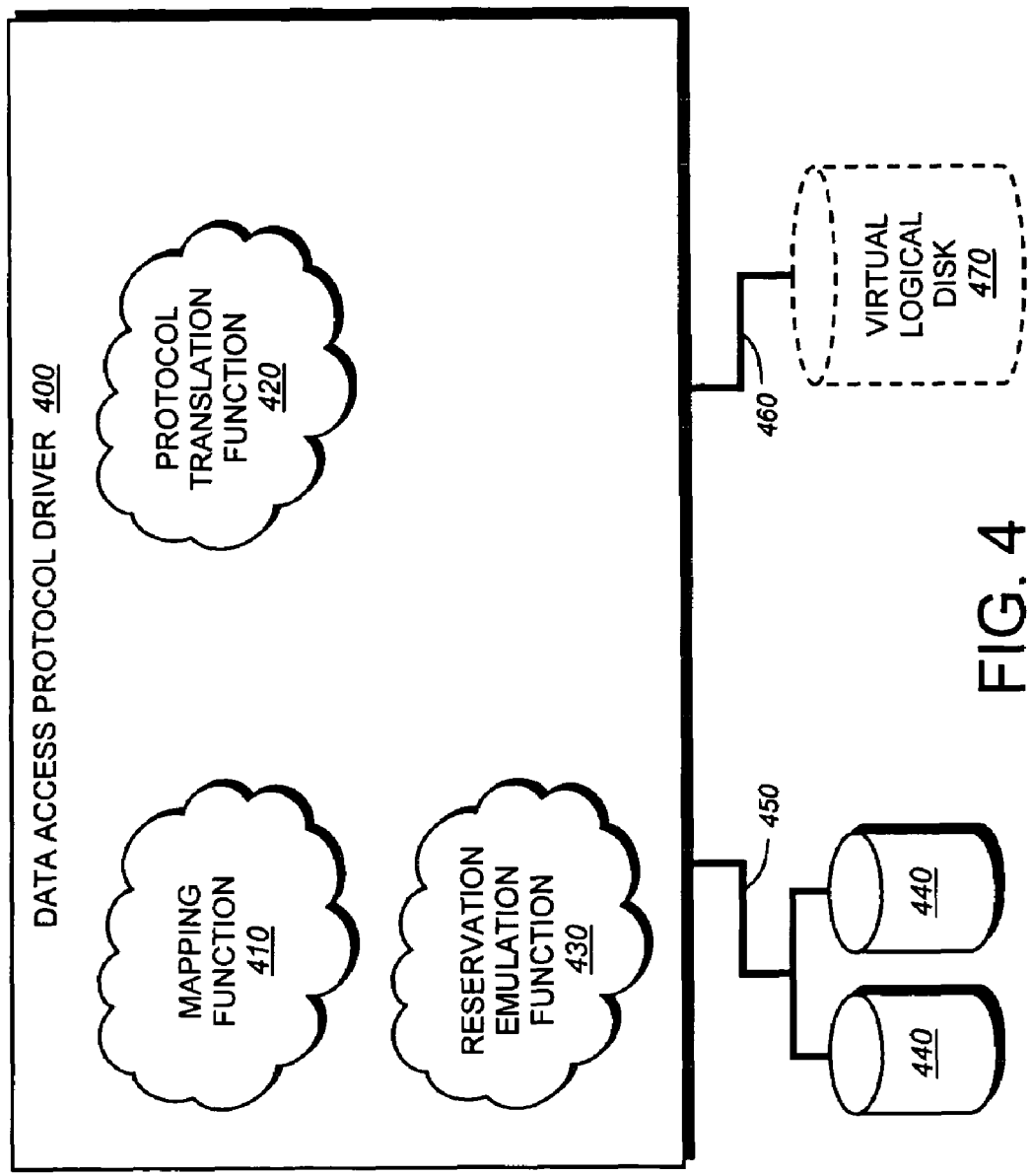
FIG. 4 is a schematic block diagram of a data access protocol driver in accordance an embodiment of the invention.

In accordance with an illustrative embodiment, SCSI protocol reservation operations supported by the locally attached storage system are mapped to file access control methods supported by a network attached storage system, such as filer 105 (FIG. 1). FIG. 4 is a schematic block diagram of a data access protocol driver 400 in accordance with an embodiment of this invention. The data access protocol drive 400 includes a mapping function 410 protocol translation function 420 and a reservation emulation function 430.

The mapping function 410 maps a unit of storage on a filer 105 to a virtual logical disk 460 of a locally attached storage system. Thus, the mapping function causes the VLD, which is embodied as a file stored on the filer, to appear as a locally attached device to the client 300 (typically, denoted by a drive "letter" appearing on a client). The novel driver 400 also includes a protocol translation function 420 that translates SCSI reservation operations or requests directed to the VLD 470 into file access control requests directed to the network attached storage, i.e. the filer. The operation of the protocol translation function 420 is further described in the above-incorporated U.S. patent application entitled SYSTEM AND METHOD FOR MAPPING BLOCK-BASED FILE OPERATIONS TO FILE LEVEL PROTOCOLS. The unit of storage on the filer is a file and the VLD 470 functions as a data container for storing the file as a logical representation of a disk in the storage system attached to the client 300. In the illustrative embodiment, the VLD stores data accordingly to the file system semantics of the client. Thus, in the example above, the VLD would store data using NTFS. Notably, is these files are sized up to the maximum storage size of the VLD (for example tens of gigabytes.) In the illustrative embodiment, the files stored on the file server utilize a set naming convention. These files are named "XXXX.VLD" where XXXX is a unique identifier associated with the client which created the virtual logical disk. It is expressly contemplated that other naming conventions can be utilized with the present invention and as such the naming convention described herein is exemplary only.

The reservation emulation function 430 emulates SCSI reservation operations by mapping SCSI reservations to a file access control method, such as UNIX UID/GID or Windows-Based Access Control Lists (ACL), as directed further below.

Broadly stated, when the file system 350 of the client 300 issues a block access request to access a disk, the data access protocol driver 400 determines whether the request is directed to a physical disk 440 or to a VLD 470. If the request is directed to a disk 440 then the data access protocol driver 400 forwards the requested block access operation to that disk. In these instances, the data access protocol driver functions similarly to a traditional block-based protocol driver, e.g., a SCSI driver. Otherwise, the block access protocol driver 400 maps the block access request to a file access request and forwards the request to the filer 105 using a file access protocol, such as NFS. If a SCSI reservation command is issued, then the reservation emulation function 430 of the data access protocol driver 400 maps the requested reservation function to the appropriate file access control methodology and forwards the command over the network 460 to the virtual logical disk 470.

C. SCSI Reservation Emulation Using File Access Control Methods

The present invention uses file access control methods, for example UNIX GID/UID or Windows ACLs, to emulate and enforce SCSI reservation policies. The illustrative embodiment achieves this using the existing network file system (NFS) version 3 protocol. By utilizing the NFS protocol, the present invention can be implemented and interoperate with numerous servers and clients that implement the NFS protocol. However, it should be expressly noted that other file protocols can be utilized in the present invention.

In the illustrative embodiment, the VLD is embodied as a file stored on a filer. The file containing the VLD utilizes, in the illustrative embodiment, UNIX-based file access control methods, i.e. UID/GID. In the illustrative embodiment, each node in a cluster uses the same user identifier (UID). Additionally, each node in the cluster uses a unique group identifier (GID). Thus, for example, a first computer may use a GID of 7 while a second computer would use 8 as its GID. The access control permissions of the file containing the VLD is set as UNIX mode 770, which corresponds to full access for the particular user ID, full access for the group ID with the file and no access for others not in the group. In accordance with the illustrative embodiment, the GID associated with the file, i.e. the GID that "owns" the file, is utilized to identify the node holding the SCSI reservation or to identify that the particular file is unreserved. For example, if computer A of a node is using a GID of 7 then, when computer A asserts a SCSI reservation over the disk, the GID associated with the VLD would be set to a value of 7. If the GID associated with the file containing a VLD is set to UNRESERVED, then no node of the cluster has a SCSI reservation on the VLD. In the illustrative embodiment, the UNRESERVED GID is implemented as the zero group.

Figure 5:
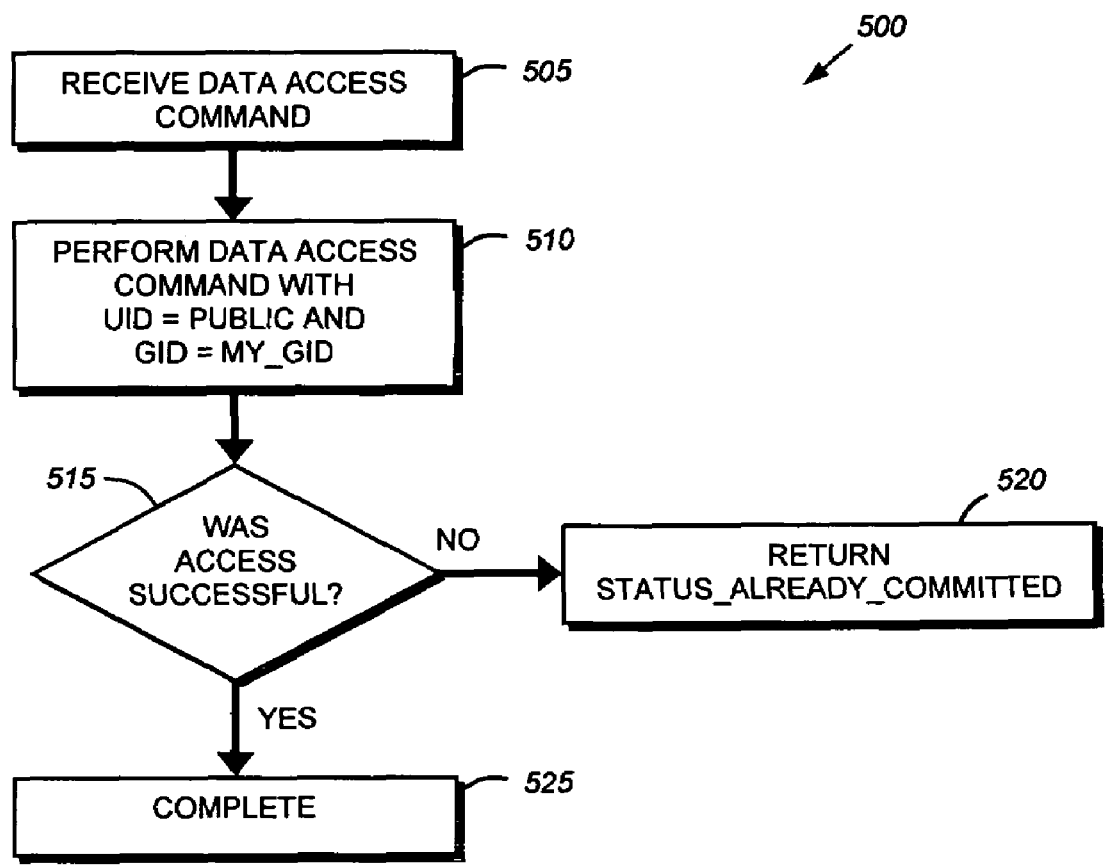
FIG. 5 is a flow chart detailing the steps of a procedure for performing data access operation in accordance with an embodiment of the invention.

FIG. 5 is a flow chart of the steps of a procedure 500 performed by the data access protocol driver 400 in performing a data access command, such as a READ or WRITE operation. Initially, in step 505, the data access protocol driver receives the data access command from a higher level of the operating system. Next, in step 510, the data access protocol driver performs the data access command with its UID set to a value of PUBLIC and its GID set as a value of MY_GID, which is the GID associated with the particular node performing the operation. After the data access command is attempted in step 510, determination is made in step 515 if the access was successful. If the access was not successful, then the particular node of the cluster attempting the data access command does not hold the SCSI reservation on this particular VLD. In response to the access failing, the data access protocol driver returns an error of STATUS_ALREADY_COMMITTED in step 520. The STATUS_ALREADY_COMMITTED error message alerts a node that the disk already has a SCSI reservation on it that is owned by another node. However, if the access was successful then the data access protocol driver completes in step 525.

Figure 6:
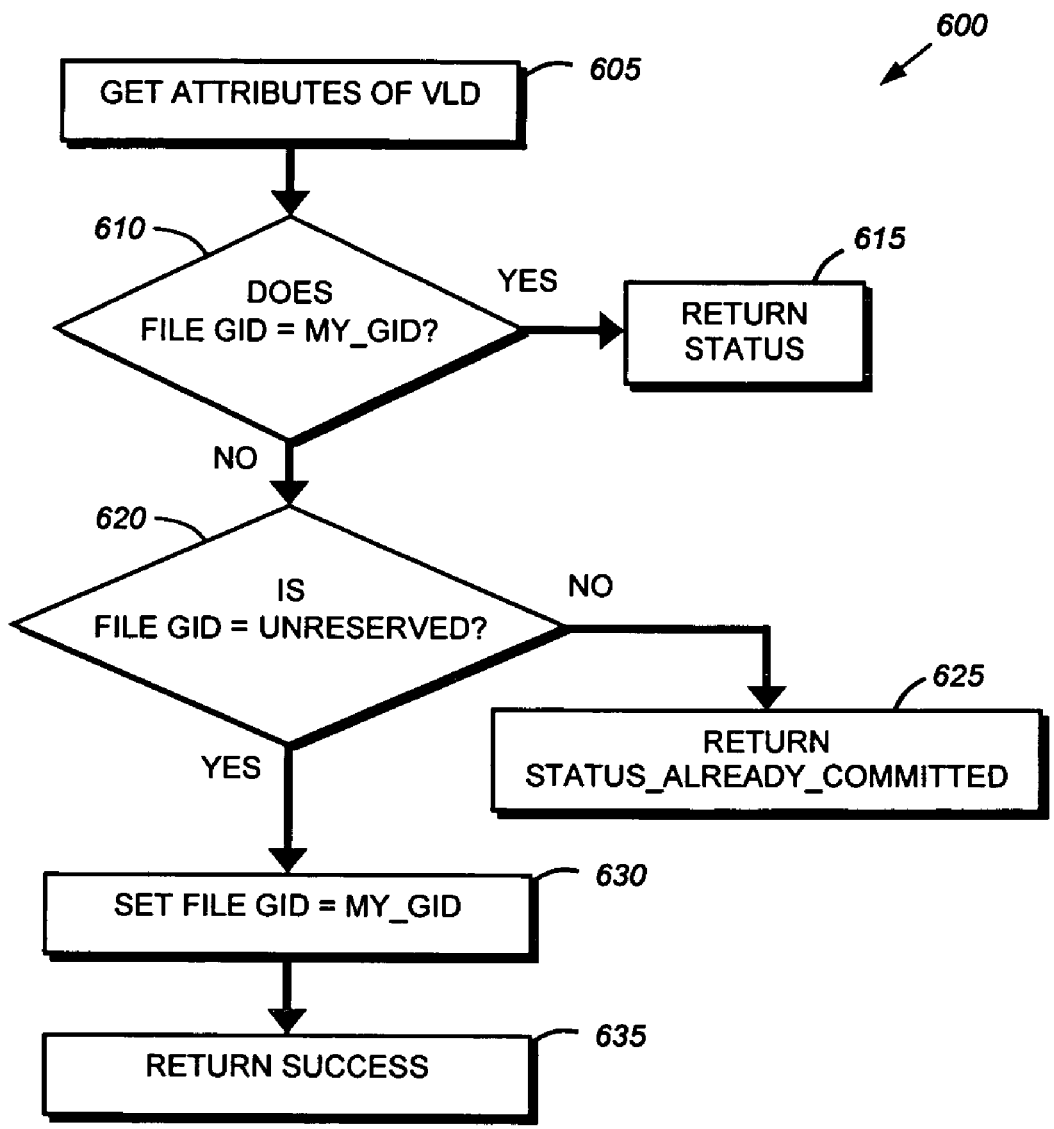
FIG. 6 is a flow chart detailing the steps of a procedure for reserving a virtual logical disk in accordance with an embodiment of the invention.

The steps of a procedure 600 performed by the data access protocol driver in setting a SCSI reservation is shown in FIG. 6. Initially, in step 605, the attributes of the VLD are obtained. These attributes can be obtained, in the illustrative embodiment, via the well-known NFS GETATTR command. After the attributes are attained, a check is performed, in step 610, to determine if the file GID equals MY_GID. If the file GID is the same as MY_GID, the VLD already has a reservation in favor of this particular node. In such a case, the data access protocol driver then returns a success in step 615. If the file GID does not equal MY_GID another check is made in step 620 to determine if the file GID is set to the UNRESERVED value. If the file GID is not set to the UNRESERVED value, then the particular VLD has a SCSI reservation in favor of another node and the procedure returns a STATUS_ALREADY_COMMITTED error message in step 625. However, if the file GID is set to the UNRESERVED value, then the procedure sets the file GID to the value of MY_GID in step 630. This sets the reservation in favor of the node that uses the GID of MY_GID. After setting the file GID value, then the procedure returns a success value in step 635.

Figure 7:
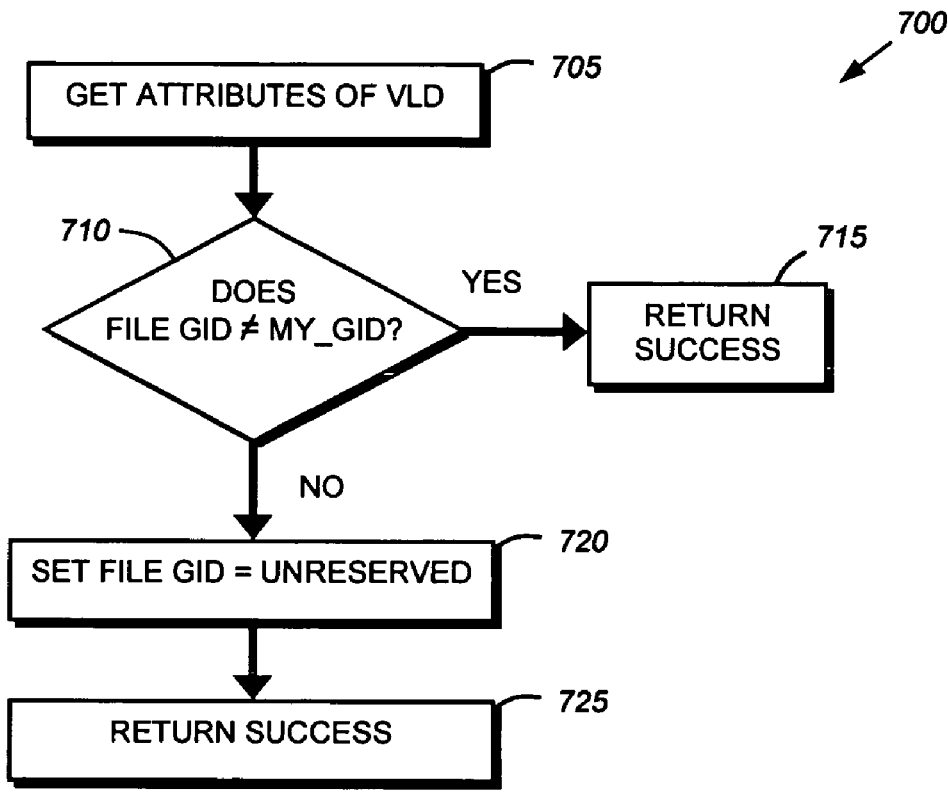
FIG. 7 is a flow chart detailing the steps of a procedure for releasing a reservation in accordance with an embodiment of the invention.

FIG. 7 is a flow chart of the steps of a procedure 700 of releasing a SCSI reservation in accordance with the illustrative embodiment of the invention. Initially, in step 705, the attributes of the VLD are obtained in a manner similar to step 605 of procedure 600. After the attributes are obtained, a check is made to determine whether the file GID does not equal MY_GID. If the file GID does not equal MY_GID, then the procedure returns a success in step 715. Otherwise the procedure sets the file GID to the unreserved value in step 720. After the file GID has been set to the unreserved value, the procedure returns a success value in step 725.

Figure 8:
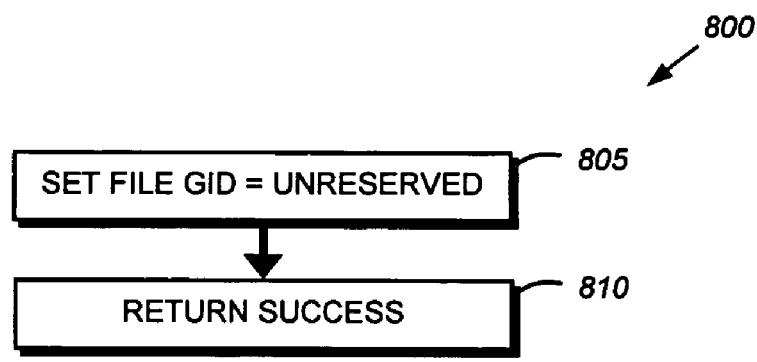
FIG. 8 is a flow chart detailing the steps of resetting a reservation in accordance with an embodiment of the invention.

It may be necessary to reset a particular SCSI reservation in the event that a error condition occurs so that a particular VLD has a reservation in favor of a node that is no longer functioning properly. FIG. 8 is flow chart of the steps of a procedure 800 used in resetting a SCSI reservation. In step 805, the procedure sets a file group ID to UNRESERVED. After setting the file group ID, the procedure, then, in step 810, returns a success value.

It should be noted that the above-described system and method for emulating SCSI reservations requires cooperation among the various nodes of a cluster for the system and method to function properly. For example, a node of a cluster could ignore the GID associated with the file containing the VLD and continue to perform input/output to the VLD. However, the system and method described herein enables a cooperating series of nodes of a cluster to emulate SCSI reservations for, e.g., arbitration of a master node of a cluster.

To again summarize, a novel data access protocol driver provides a system and method for emulating SCSI reservations using a file-level protocol. Specifically, the data access protocol driver maps SCSI reservation operations to the NFS protocol. The reservation commands are, in the illustrative embodiment, directed towards a virtual logical disk (VLD) which is embodied as a file stored on storage devices associated with a file server. In the illustrative embodiment, the SCSI reservations are emulated using UNIX-based GID/UID file access control mechanisms. Each node of a cluster is assigned a unique GID. When a node asserts a SCSI reservation on a virtual logical disk, the GID associated with the VLD is set to the GID of the node asserting the reservation. A special GID is assigned to designate that the disk UNRESERVED. If the disk is UNRESERVED then no node within the cluster has asserted a SCSI reservation on the VLD. In this manner, the system and method advantageously allows a cluster of computers to utilize file servers implementing VLDs for data storage.

The foregoing has been a detailed description of the illustrative embodiment of the invention. Various modifications and additions can be made without departing from the spirit and scope of the invention. While this description has been written with reference to the SCSI and NFS protocols, it should be noted that the principles of the invention apply to any block-based and/or file-level protocol, including, but not limited to, the Common Internet File System (CIFS), the Direct Access File System (DAFS), FCP (SCSI over Fibre Channel): SCSI (SCSI over IP), and SRP (SCSI over InfiniBand). While this description has been written in reference to SCSI disk reservations, the teachings of the present invention will work with any disk-based reservation technique. This description has been written in terms of a software data access protocol driver, however it is expressly contemplated the teachings of the invention can be implemented as software, including a computer-readable medium having program instructions executing on a computer, hardware, firmware, or a combination thereof. This description has been written in terms of virtual logical disks, however, it is expressly contemplated that the teachings of the present invention can be utilized with any file that serves as an embodiment of a disk.

As such the terms "virtual logical disk" or "VLD" should be taken to include any acceptable file acting as a storage unit for a disk. Additionally, this description has been written in terms of UNIX-based file access control methods, however it should be noted that other file access control methods, including, but not limited to, Windows-based Access Control Lists can be utilized in accordance with the teachings of the invention. Accordingly, this description should be taken only by way of example and to not otherwise limit the scope of the invention.

What is claimed is:

1. A method for emulating disk-based reservations on a virtual logical disk, comprising:
    translating, by a client, a disk-based reservation command into a network file protocol command by mapping the disk-based reservation command to the network file protocol command;
    in response to translating, transmitting, by the client, the network file protocol command to a server associated with the virtual logical disk to allow the virtual logical disk to emulate a disk locally attached to the client;
    reserving, by the server, the virtual logical disk by storing an identifier within the virtual logical disk wherein the identifier identifies the client as reserving the virtual logical disk;
    translating a release command into a release network file protocol command; and
    transmitting the release network file protocol command to release the client from reserving the virtual logical disk.

2. The method of claim 1 wherein the disk-based reservations comprises Small Computer System Interface reservations.

3. A method for emulating disk-based reservations on a virtual logical disk, comprising:
    translating, by a client, a disk-based reservation command into a network file protocol command by mapping the disk-based reservation command to the network file protocol command;
    in response to translating, transmitting, by the client, the network file protocol command to a server associated with the virtual logical disk to allow the virtual logical disk to emulate a disk locally attached to the client;
    reserving, by the server, the virtual logical disk by storing an identifier within the virtual logical disk wherein the identifier identifies the client as reserving the virtual logical disk;
    mapping a reset command to a reset network file protocol command; and
    transmitting the reset network file protocol command to reset the reservation stored on the virtual logical disk.

4. The method of claim 1 wherein the network file protocol command comprises a Network File System Command.

5. The method of claim 1 wherein the network file protocol command comprises a Common Internet File system command.

6. The method of claim 1 wherein the network file protocol command comprises a Direct Access File System command.

7. The method of claim 1 further comprising modifying, by the network file protocol command, a file access control attribute for storing the identifier of the client on the virtual logical disk.

8. The method of claim 1 wherein the identifier comprises a group identifier of the client.

9. The method of claim 1 wherein the identifier comprises an access control list.

10. A method for emulating disk-based reservations on a virtual logical disk, comprising:
    converting, by a client, a Small Computer System Interface (SCSI) reservation command into a network file protocol command by mapping the SCSI reservation command to the network file protocol command;
    in response to converting, transmitting, by the client, the network file protocol command to a server associated with the virtual logical disk to allow the virtual logical disk to emulate a disk locally attached to the client;
    reserving, by the server, the virtual logical disk by storing an identifier within the virtual logical disk wherein the identifier identifies the client as reserving the virtual logical disk;
    mapping a SCSI release command to a release network file protocol command; and
    transmitting the release network file protocol command to release the client from reserving the virtual logical disk.

11. A method for emulating disk-based reservations on a virtual logical disk, comprising:
    converting, by a client, a Small Computer System Interface (SCSI) reservation command into a network file protocol command by mapping the SCSI reservation command to the network file protocol command;
    in response to converting, transmitting, by the client, the network file protocol command to a server associated with the virtual logical disk to allow the virtual logical disk to emulate a disk locally attached to the client;
    reserving, by the server, the virtual logical disk by storing an identifier within the virtual logical disk wherein the identifier identifies the client as reserving the virtual logical disk;
    mapping a SCSI reset command to a reset network file protocol command; and
    transmitting the reset network file protocol command to reset the reservation stored on the virtual logical disk.

12. A system, comprising:
    a client computer executing a translation function configured to convert a Small Computer System Interface (SCSI) reservation command into a network file protocol command;
    a network adapter configured to transmit the network file protocol command to a server associated with a virtual logical disk from the client;
    the server configured to reserve the virtual logical disk by storing an identifier within the virtual logical disk, wherein the identifier identifies the client as reserving the virtual logical disk;
    the client computer further configured to map a SCSI reset command to a reset network file protocol command; and
    the network adapter further configured to transmit the reset network file protocol command to the server for the server to reset the reservation stored on the virtual logical disk.

13. The system of claim 12, wherein the client computer is further configured to map a SCSI release command to a release network file protocol command and the network adapter is further configured to transmit the release network file protocol command to the server for the server to release the client from reserving the virtual logical disk.

14. The system of claim 12, wherein the network file protocol command modifies a file access control attribute for storing the identifier of the client on the virtual logical disk.

15. The system of claim 12, wherein the identifier comprises a group identifier of the client.

16. The system of claim 12, wherein the identifier comprises an access control list.

* * * * *

UNITED STATES PATENT AND TRADEMARK OFFICE
CERTIFICATE OF CORRECTION

PATENT NO. : 7,711,539 B1
APPLICATION NO. : 10/217038
DATED : May 4, 2010
INVENTOR(S) : Jeffrey S. Kimmel Page 1 of 1

It is certified that error appears in the above-identified patent and that said Letters Patent is hereby corrected as shown below:

In the Specifications:

In col. 8, line 24 should read
above, the VLD would store data using NTFS. Notably, ~~is~~

Signed and Sealed this
Ninth Day of July, 2013

Teresa Stanek Rea
*Acting Director of the United States Patent and Trademark Office*